United States Patent
Saeva

[11] 3,943,369
[45] Mar. 9, 1976

[54] LIQUID CRYSTALLINE INFORMATION TRANSFER

[75] Inventor: Franklin D. Saeva, Webster, N.Y.

[73] Assignee: Xerox Corporation, Stamford, Conn.

[22] Filed: Apr. 29, 1974

[21] Appl. No.: 465,051

[52] U.S. Cl. .......... 250/568; 250/225; 340/173 LT; 350/150; 350/154; 350/160 LC
[51] Int. Cl.² .............................................. G01F 1/13
[58] Field of Search .......... 250/568, 225; 350/150, 350/154, 160 LC; 340/173 LT, 173 LS

[56] References Cited
UNITED STATES PATENTS

| | | | |
|---|---|---|---|
| 3,603,801 | 9/1971 | Harris et al. ........................ | 250/225 |
| 3,631,253 | 12/1971 | Aldrich et al. ...................... | 250/550 |
| 3,697,150 | 10/1972 | Wysocki .................... | 350/160 LC X |
| 3,780,307 | 12/1973 | Saeva et al. ............ | 350/160 LC UX |

*Primary Examiner*—Alfred E. Smith
*Assistant Examiner*—Matthew W. Koren
*Attorney, Agent, or Firm*—James J. Ralabate; Michael H. Shanahan; George J. Cannon

[57] ABSTRACT

The optical transitions of extrinsically optically active insoluble materials become optically active and circularly dichroic when in contact with optically negative liquid crystalline materials thereby providing unusual and highly advantageous properties. The circularly dichroic optical properties induced in the extrinsically optically active insoluble materials can be utilized for information transfer applications.

10 Claims, 5 Drawing Figures

LIQUID CRYSTALLINE INFORMATION TRANSFER

BACKGROUND OF THE INVENTION

This information relates to liquid crystalline materials and, more specifically, to uses of compositions comprising optically negative liquid crystalline materials and insoluble extrinsically optically active materials which become optically active when in contact with optically negative liquid crystalline materials.

Liquid crystalline substances exhibit physical characteristics, some of which are typically associated with liquids and others which are typically unique to solid crystals. The name "liquid crystals" has become generic to substances exhibiting these dual properties. Liquid crystals are known to appear in three different forms: the smectic, nematic, and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

Some liquid crystalline substances possess optically negative characteristics. Birefringence, also referred to as double refraction, is an optical phenomenon characteristic of some solid crystals and most liquid crystal substances. When a beam of unpolarized light strikes a birefringent substance, it is split into two polarized components whose transverse vibrations are at right angles to each other. The two components are transmitted at different velocities through the substance and emerge as beams of polarized light. By the term "liquid crystalline substances which have optically negative characteristics", as used herein, is meant those for which the extraordinary index of refraction $\eta_E$ is smaller than the ordinary index of refraction $\eta_o$. Cholesteric liquid crystal substances exhibit this property. For a detailed description of this phenomenon, see *Optical Crystallography*, Wahlstrom, Fourth Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Structure and the Properties of Liquid Crystals*, G. W. Gray, Academic Press, 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with $n$ representing the index of refraction of the liquid crystal substance and $p$ the pitch or repetition distance of the helical structure. The bandwidth $\Delta\lambda_o$ of this wavelength band centered about $\lambda_o$ will typically be of the order of about $\lambda_o/14$. For light of a wavelength $\lambda_o$, the cholesteric liquid crystal, under these conditions, exhibits selective reflection of the light such that approximately 50% of the light is reflected and approximately 50% is transmitted, assuming negligible absorption which is usually the case, with both the reflected and transmitted beams being approximately circularly polarized in opposite directions.

For light having wavelengths around $\lambda_o$ but not at $\lambda_o$, the same effect is present but not as pronounced. The transmitted light is not circularly polarized but is instead elliptically polarized. The cholesteric liquid cyrstals which exhibit this property of selective reflection of light in a region centered around some wavelength $\lambda_o$ are said to be in the Grandjean or "disturbed" texture. If $\lambda_o$ is in the visible region of the spectrum, the liquid crystalline film appears to have the color corresponding to $\lambda_o$ and if $\lambda_o$ is outside the visible spectral region, the film appears colorless.

Depending upon the intrinsic rotary sense of the helix, i.e., whether it is right-handed or left-handed, the light that is transmitted in the region about $\lambda^o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystal having an intrinsic helical structure which is left-handed in sense will transmit LHCPL and one having a helical structure which is right-handed in sense will transmit RHCPL.

Hereinafter, these cholesteric liquid crystal substances will be identified in order to conform with popular convention, by the kind of light which is reflected at $\lambda_o$. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely, a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50% transmitting at $\lambda_o$ for these sources when the liquid crystal is in its Grandjean texture.

A further unique optical property of optically negative liquid crystal film is that contrary to the normal situation when light is reflected, such as by mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o = 2np$ is directed at a right-hand film, it is substantially completely reflected and, after reflection, remains RHCPL. If the same light were to be directed on a metallized mirror, in reflected light would be LHCPL.

Because of these optical properties, optically negative liquid crystalline substances have been found to be highly advantageous for use in a number of applications. U.S. Pat. No. 3,669,525 and 3,679,290 disclose the use of such liquid crystalline materials in optical filter systems. U.S. Pat. No. 3,744,920 discloses the use of these materials in a detection system which can identify physical surface and/or electrical conductivity irregularities in a surface of interest.

Extremely large extrinsic circular dichroism has been observed within the electronic transitions of achiral (optically inactive) solutes dissolved in cholesteric mesophases as reported in recently issued U.S. Pat. No. 3,780,304 to F. D. Saeva et al and in the following articles by F. D. Saeva et al appearing in the *Journal of the American Chemical Society (JACS)*: "Cholesteric Liquid-Crystal-Induced Circular Dichroism (LCICD) of Achiral Solutes. A novel Spectroscopic Technique", Vol. 94, JACS, page 5135 (1972); "Cholesteric Liquid-Crystal-Induced Circular Dichroism (LCICD). V. Some Mechanistic Aspects", Vol. 95, JACS, page 7656 (1973); "Cholesteric Liquid-Crystal-Induced Circular Dichroism (LCICD). VI. LCICD Behavior of Benzene and Some of its Mono- and Disubstituted Derivatives", Vol. 95, JACS, page 7660 (1973); and "*Cholesteric Liquid-Crystal-Induced Circular Dichroism* (LCICD). VII. LCID of Achiral Solutes in Lyotropic Cholesteric Mesophases", Vol. 95 JACS, page 7882 (1973).

Circular dichroism has not been previously reported as induced in extrinsically optically inactive insoluble materials and it has heretobefore been thought by those working in the art as evidenced by the above articles that two mechanisms were important to the existence of Liquid Crystal Induced Circular Dichroism in dissolved materials: (1) helical organization of solute, and (2) the exposure of solute to a helical organization of liquid crystal molecules. Shortly after the invention of this Application, data was reported which indicated that mechanism (1) was not required for the observation of extrinsic LCICD within solutes in the cholesteric mesophase. That is, the solute molecules need not be ordered into helical organization by the mesophase in order to exhibit liquid crystal induced circular dichroism. The date is reported in "The Optical Activity of Achiral Molecules in a Cholesteric Solvent", *J.C.S. Chem. Comm., page* 712, 1973.

It is known that the pitch of cholesteric liquid crystalline substances is responsive to various foreign stimuli such as heat, pressure, electric fields, magnetic fields, etc. In some cases this characteristic is a highly desirable advantage, such as where the substance is used in a detection system to indicate the presence, or a change in the amount present, of any particular stimulus. However, according to some uses of these substances, the fact that their performance is affected by foreign stimuli is not an advantage and it would be desirable to have materials whose performance in a particular mode would be essential independent of the presence of the above mentioned stimuli.

In rapidly growing areas of technology such as liquid crystals new methods, apparatus, compositions and articles of manufacture are often discovered for the application of the new technology in a new mode. The present invention relates to novel and advantageous uses of extrinsically optically active insoluble materials in contact with optically negative liquid crystalline materials.

SUMMARY OF THE INVENTION

It is, therefore, an object of this invention to provide an optical system having the above mentioned desirable features.

It is another object of the invention to provide an optical system employing optically negative liquid crystalline compositions which system is operative essentially independently of the presence of foreign stimuli.

It is a still further object of the invention to provide an information transfer system utilizing circular dichroism induced in extrinsically optically active insoluble materials in contact with an optically negative liquid crystalline material.

The above mentioned objects and advantages and others are realized in accordance with the invention by employing optically negative liquid crystalline substances in contact with extrinsically optically active insoluble materials whose electronic transitions, i.e., effect obtained from the interaction of light energy with the electrons of the molecules, become circularly dichroic (i.e., show a large preferential absorption of either LHCPL or RHCPL) when in contact with an optically negative liquid crystalline material. It should be understood that by the term "extrinsically optically active insoluble materials" we mean both intrinsically optically active and intrinsically optically inactive insoluble materials which are optically active or inactive, respectively, out of contact (or when not in contact) with optically negative liquid crystalline substances. Both intrinsically optically active insoluble materials and optically inactive insoluble materials become extrinsically optically active when contacted with an optically negative liquid crystalline material. This extrinsic induced behavior may overwhelm and dominate over any intrinsic activity since the specific rotations and molecular ellipticities in the former case are normally substantially larger than that observed for intrinsically optically active insoluble materials.

"Insoluble" is used herein to mean that dissolution of the material added to or contacted by the optically negative liquid crystalline material can not be detected by conventional photometric techniques, such as circular dichroism and optical absorption.

It has been found that when such extrinsically optically active insoluble materials are placed in or otherwise contacted by cholesteric mesophases, optical activity is induced in the optically inactive materials and they exhibit circularly dichroic behavior within their absorption bands. The optical behavior induced in the normally optically inactive insoluble materials is due to absorption whereas the circular dichroic behavior of optically negative liquid crystalline substances in the region $\lambda_o$ is due to selective reflection of one type of circularly polarized light. The insoluble materials which acquire the induced optical activity, as opposed to the optically negative liquid crystalline substances, absorb both RHCPL and LHCPL; however, they show a large preference for one type more than for the other type.

Thus, such insoluble materials may be utilized in devices which can be tuned to the absorption band of the insoluble materials rather than the reflection band of the optically negative liquid crystalline substance; or use may be made of both absorption bands of such insoluble materials and reflection bands of optically negative liquid crystalline materials.

The invention will be more fully understood from the following detailed description of various preferred embodiments thereof particularly when read in conjunction with the accompanying drawings wherein.

Figure 5:
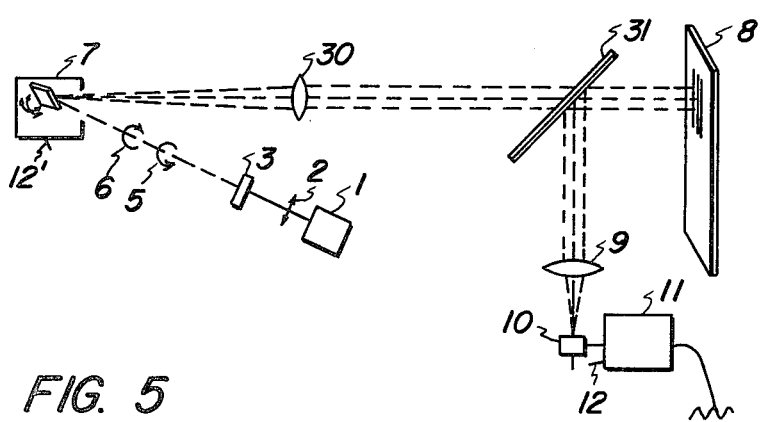

FIG. 5 schematically illustrates a scheme whereby circular dichroism information is read from a liquid crystalline film by optical reflection therefrom and whereby such read information is converted into synchronized signals.

Figure 1:
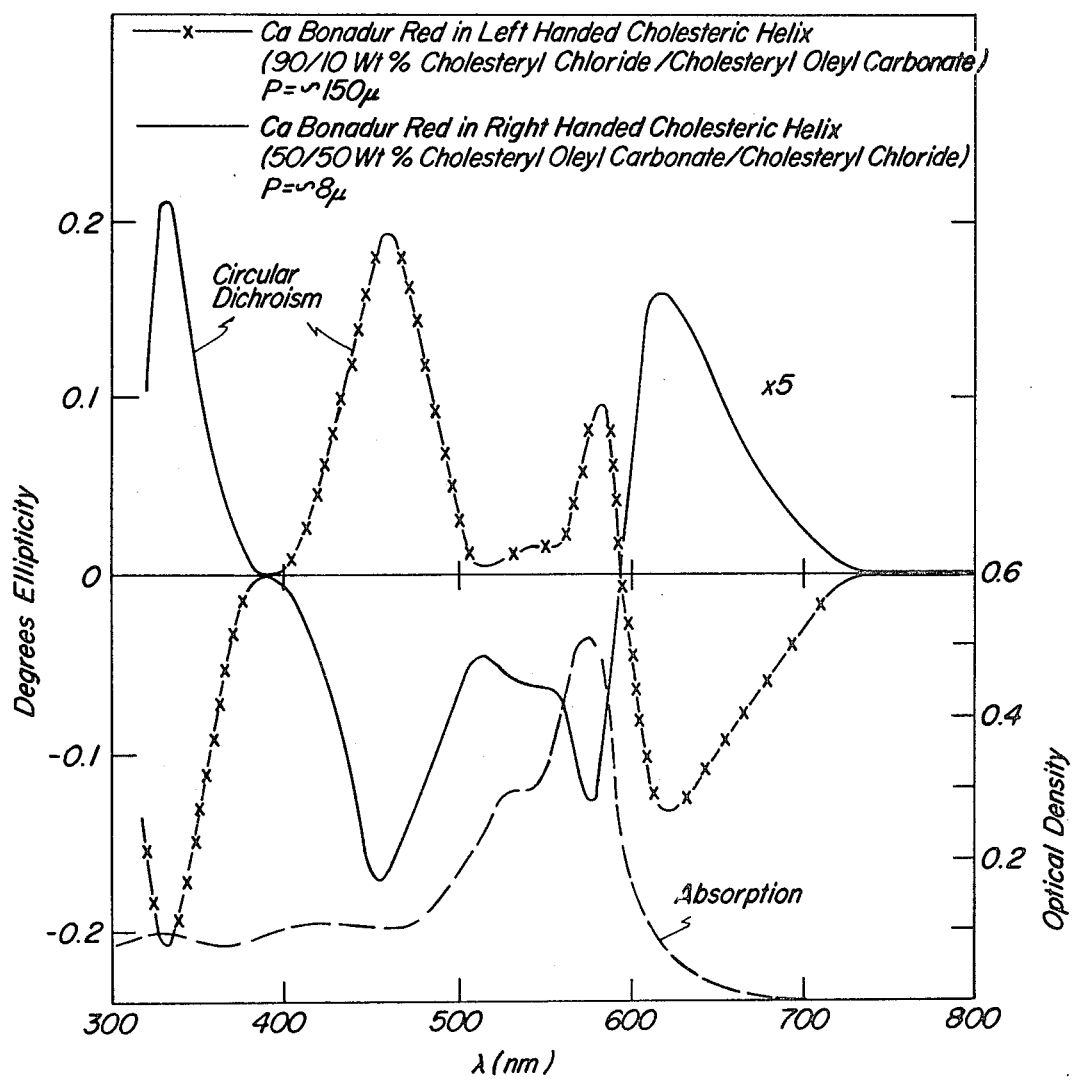
FIG. 1 shows the circular dichroism and absorption spectra of Calcium Bonadur Red particles suspended in the cholesteric mesophases of cholesteryl oleyl carbonate and cholesteryl chloride.

Referring now to FIG. 1, there is seen the circular dichroism and absorption spectrum of a thin film (about 5 microns thick) of insoluble Calcium Bonadur Red pigment particles suspended in the cholesteric mesophases of cholesteryl oleyl carbonate and cholesteryl chloride. The pigment particles are insoluble in the cholesteric mesophase and are much larger in size than the liquid crystal molecules. Surprisingly, it was found that the insoluble particles exhibited liquid crystal induced circular dichroism not withstanding the fact that their large size relative to the molecules of the cholesteric mesophase prevented their being ordered into helical organization by the helical array of molecules of the cholesteric mesophase.

In the right-handed cholesteric helix CD bands of negative sign ($E_R > E_L$) appear at about 450, 520, and 580 nm while positive CD bands appear at about 340 and 620 nm. In the left-handed cholesteric helix the above mentioned CD bands are of opposite sign to that found in the right-handed cholesteric helix. A major peak of absorption appears at about 580 nm of light and a shoulder at about 520 nm of light in the absorption spectrum. These wavelengths are within the visible region. The absorption and circular dichroism exhibited within the visible region is attributable solely to circular dichroism induced in the particles. It was further found, as seen from comparing particles sizes in Examples 1 and 2, below, that the phenomenon of circular dichroism induced in the particles may be a surface phenomenon. The ratio of circular dichroism to optical density increases in intensity with increase in surface area provided by the particles. That is, for the same weight amount of insoluble particles suspended in the cholesteric mesophase, a greater ratio is exhibited by smaller sized particles than by larger sized particles. The sign of extrinsic circular dichroism in the particles is independent of the position of the cholesteric pitch band $\lambda_o$.

Figure 2:
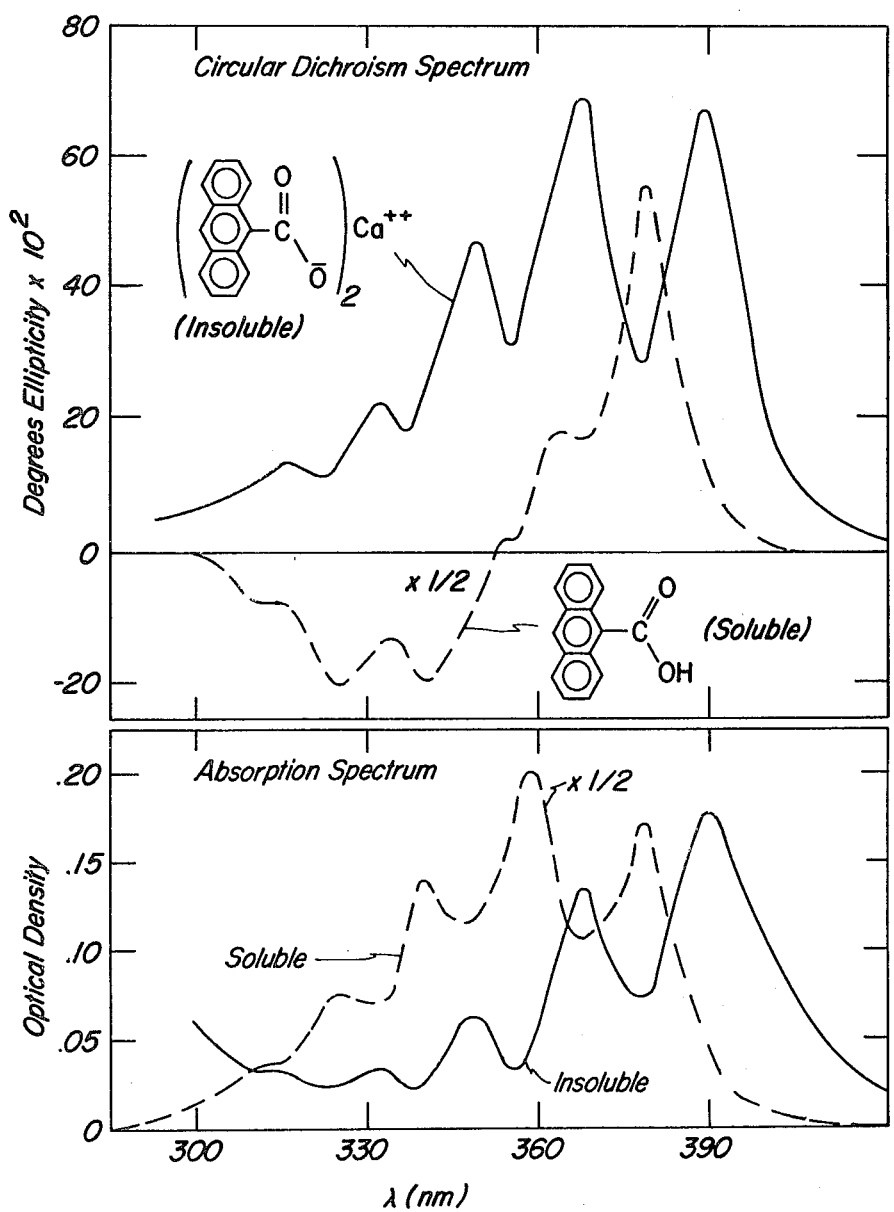
FIG. 2 shows the circular dichroism and absorption spectra of soluble and insolubilized anthracene-9-carboxylic acid in the cholesteric mesophase of cholesteryl chloride (60 wt. %) - cholesteryl nonanoate (40 wt. %).

FIG. 2 presents for comparison the absorption and circular dichroism spectra of soluble and insolubilized anthracene-9-carboxylic acid. It is noted that while the soluble anthracene-9-carboxylic acid in the cholesteric mesophase (60 wt. %) cholesteryl chloride - 40 wt. % cholesteryl nonanoate) exhibits a change in sign in circular dichroism which is dependent upon the position of the cholesteric pitch band $_o$, the insolubilized anthracene-9-carboxylic acid remains positive in sign in circular dichroism ($E_L > E_R$) notwithstanding change in position of the cholesteric pitch band $\lambda_o$.

Previously, it was observed with solutes in cholesterics that the sign of circular dichroism induced in the solute was dependent upon the position of $\lambda_o$ relative to solute absorption as well as the handedness of the cholesteric mesophase.

Of course, it will be recognized that the particular insoluble materials of FIGS. 1 and 2 are typical of the insoluble optically inactive materials of the invention and are used to illustrate what effect is obtained; similar results can be obtained with any of the insoluble optically inactive materials encompassed by the invention.

Experimental results with insoluble materials indicate that the intensity of the induced circularly dichroic absorption band varies with variation in pitch of the cholesteric mesophase, as well as with the chirality of the cholesteric helix. The sign of the extrinsic circular dichroism changes with chirality of the cholesteric helix. However, the sign of the extrinsic dichroism is independent of the wavelength location of the optically negative liquid crystalline pitch band $\lambda_o$ relative to the wavelength location of the absorption band of the insoluble material.

An important advantage derived from exploiting the induced circular dichroic optical activity of the absorption band of the insoluble materials contacted with the optically negative liquid crystalline material is that the absorption band will always remain substantially in the same position and will not be shifted to any significant extent by the presence of foreign stimuli. The magnitude of the optically active effect will typically change when a foreign stimulus acts upon the composition but the position of the band will not. This behavior is opposite to that of the pitch band of the optically negative liquid crystalline composition when acted upon by a foreign stimulus since, as is appreciated by those skilled in the art, the location of the pitch band changes but the amplitude thereof is always substantially the same. For example, when a stimulus acts upon the optically negative liquid crystalline environment, the pitch may become larger causing $\lambda_o$ to become larger (since $\lambda_o = 2np$).

Thus, it can be seen that the addition of extrinsically optically active insoluble materials whose absorption bands become highly optically active when in contact with an optically negative liquid crystalline environment permits a novel and highly advantageous means for tailoring the properties of optically negative liquid crystal systems to achieve novel and extremely useful results. The above mentioned additives can be used to provide a circularly dichroic absorption band for the composition.

The additives which can be placed in contact with optically negative liquid crystalline substances according to the invention should be insoluble (as previously defined) in such a liquid crystalline environment and should have optical transitions which become circularly dichroic in some region of the electromagnetic spectrum. Any suitable extrinsically optically active insoluble material can be used according to the invention. Typical suitable extrinsically optically active insoluble materials include, among others, organic and inorganic pigments, aromatic insoluble compounds such as insolubilized benzene, napthalene, anthracene and the like; insoluble azo compounds such as insolubilized arylazonaphthols, azobenzenes, etc.; insoluble nitro compounds such as insolubilized nitrobenzene, nitroarylazonaphthols and the like; insoluble nitroso compounds such as insolubilized nitrosonaphthalene and the like; insoluble compounds such as insolubilzed benzylidene aniline, etc.; insoluble carbonyl compounds such as insolubilized acetone, acetophenone, benzophenone and the like; insoluble thiocarbonyls such as insolubilized thioacetophenones, thioacetone, thiobenzophenone, and the like; insoluble alkenes such as insolubilized butadiene, cyclohexane, etc.; insoluble heterocyclics such as insolubilized furans, aziridines, pyridines and the like, insoluble alkanes such as insolubilized hexane, dodecane and the like; metallic complexes; dyes such as polymethin, sulfur, indigo and anthraquinone dyes; and mixtures thereof.

Typical methods of insolubilizing include adsorbing on suitable surfaces and converting to ionic derivatives.

Generally speaking, it is preferred to use extrinsically optically active additive materials that absorb in the visible region of the spectrum such as, for example, inorganic and organic pigments in the novel compositions of the invention since the colored additives will provide preferred results when the compositions are utilized in various modes of application as will be discussed in detail hereinafter. For example, in a preferred embodiment of the invention where the compositions of the invention are employed in an imaging mode the use of colored additive materials will permit readout in the visible region of the spectrum of an image where the optical input is not in the visible spectral region of the electromagnetic spectrum.

Of course, it should be recognized that the above classes of materials are intended to be illustrative only of the insoluble additives which will provide the previously described induced behavior.

The amount of insoluble material which can be incorporated into an optically negative liquid crystalline can vary over an extremely wide range. The amount added in any particular instance is dependent primarily upon the intended use of the particular composition. For example, where it is intended to exploit the induced optical activity of the absorption band of the additive as little as up to about 10% by weight of optically inactive material can provide the induced optical activity. Of course, the upper limit of the amount of additive which can be incorporated into any particular optically negative liquid crystal composition, and which can go as high as about 90% by weight, is controlled by the requirement that the total environment must retain its optically negative liquid crystalline character after the addition of the optically inactive material.

Any suitable cholesteric liquid crystal substance, mixtures thereof or compositions having liquid crystalline characteristics may be employed in the invention. Typical suitable cholesteric liquid crystals include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesterol and carboxylic acids, for example, cholesteryl crotonate; cholesteryl nonanoate, cholesteryl hexanoate; cholesteryl formate; cholesteryl docosonoate; cholesteryl proprionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2(2-butoxyethoxy) ethyl carbonate; cholesteryl-1-2-(2-methoxy-ethoxy) ethyl carbonate; cholesteryl geranyl carbonate; cholesteryl heptyl carbamates; and alkyl amides and aliphatic secondary amines derived from $3\beta$amino$\Delta$5-cholestene and mixtures thereof; peptides such as poly-$\gamma$-benzyl-L-glutamate; derivatives of beta sitosterol such as sitosteryl chloride; and amyl ester of cyano benzilidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise substituted benzene ring compounds. Any of the above compounds and mixtures thereof may be suitable for cholesteric liquid crystalline materials in the advantageous system of the present invention.

Mixtures of liquid crystals can be prepared in organic solvents such as chloroform, petroleum ether and others, which are typically evaporated from the mixture leaving the liquid crystal composition. Alternatively, the individual components of the liquid crystalline mixture can be combined directly by heating the mixed components above the isotropic transition temperature.

The above lists of typical suitable optically negative liquid crystalline substances are intended to encompass mixtures of the above. These lists are intended to be representative only and are not to be construed as being exhaustive or limiting the invention to the specific materials mentioned. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as those mentioned above will only possess the necessary properties which make them suitable for use according to the invention at some specific temperature range which may be at room temperature or substantially below or above room temperature. However, all of the various substances, mixtures or combinations thereof will function according to the method at some temperature. Typically, the materials of the invention will be used at or near room temperature. Thus, it is preferred to employ liquid crystal substances which have a liquid crystal state at or near room temperature. Generally speaking, the liquid crystal substance will preferably be in the liquid crystal state at the desired operational temperature.

Typical suitable thicknesses of films or layers of optically negative liquid crystalline material are from about 0.5 to about 50 microns, although any thickness which will provide the desired effect can be used.

The invention will now be described further in detail by way of examples, it being understood that these are intended to be illustrative only and the invention is not limited to the conditions, materials, procedures, etc., recited therein. All parts and percentages listed are by weight unless otherwise specified.

EXAMPLE I

The calcium salt of 3'-ethyl-4'-chloro-6'-sulfonylphenylazo-2-hydroxy-3-naphthoic acid (Calcium Bonadur Red) is finely ground between two pieces of ground glass to an average particle size of about 10 microns. About 0.1 gm. of the particles are uniformly dispersed in about 11 gm. of the cholesteric mesophase of cholesteryl oleyl carbonate and cholesteryl chloride (50/50 wt. %). The dispersion is placed between circular quartz plates about 1 in. × ⅛ in. in dimension. The absorption spectrum of the prepared sample is analyzed with a Carey 15 Spectrophotometer. The prepared sample is analyzed with a Carey 61 Spectropolarimeter for circular dichroism. FIG. 1 graphically illustrates the resulting circular dichroism spectrum.

The absorption spectrum shows a major peak at about 580 nm and a shoulder at about 520 nm. The circular dichroism spectrum shows bands of negative sign ($E_R > E_L$) at about 520 nm.

The dispersion was then centrifuged and the dispersed particles thereby separated from the cholesteric mesophase. The cholesteric mesophase was then re-examined spectrophotometrically and shows no absorption or circular dichroism in the visible region of the spectrum. This eliminates the possibility of particles having dissolved in the mesophase and indicates that circular dichroism may arise from a surface effect.

Example I demonstrates that circular dichroism can be induced in insoluble materials by dispersing same in an optically negative liquid crystalline material.

EXAMPLE II

Example I is repeated except that the particles are ground to an average particle size of about 2 microns. The ratio of circular dichroism to optical density is determined to be larger with these about 2 micron particles than with the about 10 micron particles of Example I. This buttresses the indication of Example I that the induced circular dichroism in insoluble materials may be a surface phenomenon because the smaller particles present a larger surface area in contact with the optically negative crystalline substance.

Except for the difference in the ratio, the same results are obtained in Example II as are obtained in Example I.

EXAMPLE III

Two samples are prepared as follows: each sample contains the cholesteric mesophase of 60% cholesteryl chloride-40% cholesteryl nonanoate. In sample I, anthracene-9-carboxylic acid dissolved in the mesophase. In sample II, particles of insoluble calcium anthracene-9-carboxylic acid are dispersed in the mesophase. The absorption and circular dichroism spectrums of samples I and II are determined in the manner of Example I. FIG. 2 graphically illustrates the resulting spectra.

The circular dichroism induced in the dissolved acid in sample I changes sign at about 355 nm indicating a change in polarization of the electronic transitions. The dispersed insoluble particles of calcium anthracene-9-carboxylic acid in sample II exhibit induced circular dichroism which does not change sign with polarization of the electronic transition.

The circular dichroism of insoluble particles in sample II exhibits bands which are slightly blue shifted from the absorption bands for the particles. The relative intensities of the circular dichroism bands of the particles in sample II are more similar to the relative intensities of the absorption bands of the dissolved acid in sample I than to those of the absorption bands of the insoluble particles in sample II. The sign of the circular dichroism induced in the insoluble particles of sample II is positive ($E_L > E_R$) and independent of whether $\lambda_o$ for the cholesteric mesophase is at larger or smaller wavelengths than the absorption band of the particles.

The difference in depending upon position of $\lambda_o$ between the dissolved acid in sample I and undissolved particles in sample II indicates a difference in mechanism between induced circular dichroism in solutes and induced circular dichroism in insoluble materials in intimate contact with optically negative liquid crystalline materials.

EXAMPLE IV

Vanadyl phthalocyanine (VOPC) is heated in a vacuum to sublime a film of VOPC upon a quartz disc about 1 in. × 1 in. × ⅛ in. The VOPC film is overcoated with a layer of the cholesteric mesophase of cholesteryl oleyl carbonate (COC) which, in turn, is contacted with a glass plate to produce a glass-VOPC-COC-quartz disc sandwich.

The absorption and circular dichroism spectrum of the COC-VOPC combination was examined and the circular dichroism was observed in the region of the visible electronic transitions of VOPC. This observation demonstrates that circular dichroism induced in insoluble materials in intimate contact with optically negative liquid crystalline materials is due to specific interaction between the two materials.

EXAMPLE V

Example IV is repeated except that the VOPC is replaced with copper phthalocyanine (CuPC). Circular dichroism is observed in the visible electronic transition of CuPC.

EXAMPLE VI

Example I is followed except that Bonadur Red is replaced by copper phthalocyanine (CuPC).

The absorption spectrum shows major peaks at about 600 nm and about 690 nm. The circular dichroism spectrum shows bands of positive sign ($E_R > E_L$) at about 595 nm and about 680 nm.

The CuPC particles are centrifuged out and the liquid crystalline material re-examined spectrophotometrically; no absorption or circular dichroism in the visible region is exhibited. This eliminates the possibility that circular dichroism was exhibited by dissolved molecules rather than by insoluble particles.

EXAMPLE VII

Particles of calcium anthracene-9-carboxylic acid are dispersed in a supercooled cholesteric mesophase of 60% cholesteryl chloride - 40% cholesteryl nonanoate. The dispersion is sandwiched at a thickness of about 7 microns between two tin-oxide coated quartz discs 1 in. × 1 in. × ⅛ in. A.D.C. voltage is applied to the oxide coatings to apply an electric field across the dispersion while the dispersion is being examined for circular dichroism induced in the particles. Upon application of the field, a change in both sign and magnitude of the induced circular dichroism is observed within the absorption bands of the dispersed particles.

The circular dichroism intensity is substantially completely eliminated when the applied voltage is about 400 volts D.C.

Example VII demonstrates that the application of electric fields across cholesteric mesophases in contact with an insoluble material, alters both the sign and magnitude of the induced (extrinsic) circular dichroism.

The invention described herein may be practiced with conventional apparatus, the availability of which is well known to those people skilled in the art of information transfer. In accordance with the present invention, however, a novel electro-optic effect, circular dichroism induced in extrinsically optically active insoluble materials in contact with optically negative liquid crystalline materials, is utilized to generate the information which is transferred and subsequently converted into synchronized signals at the transmitting station and subsequently reconverted into optical information at the receiving station utilized to address an optical information recording device at the receiving station.

Figure 3:
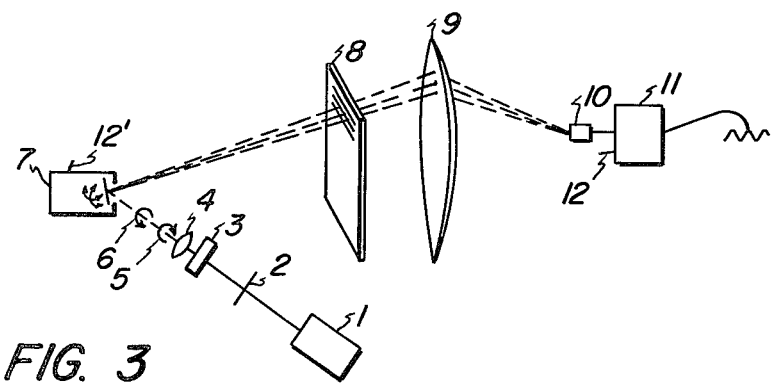
FIG. 3 is a schematic illustration of one embodiment of a scheme whereby information on circular dichroism is read from a liquid crystalline film by the transmission of light therethrough and the conversion of the information so read into synchronized signals.

Referring now to FIG. 3, there is seen a light source 1 which generates light of very narrow range of wavelengths, preferably of about a single wavelength, the optical output of which is linearly polarized by linear polarizer 2. The linearly polarized light passing through linear polarizer 2 then passes through an electro-optic modulator which produces alternately right-hand circularly polarized light and left-hand circularly polarized light, in sequence, to produce pulses of light which, in succession in the direction of propagation, comprises a repetitive sequence of alternating right-hand circularly polarized light pulse followed by a left-hand circularly polarized pulse and so forth. For convenience of description, the term circularly polarized pulses (hereafter denoted CPLP) is used herein to refer to the sequence of a right-hand circularly polarized pulse of light followed by a left-hand circularly polarized pulse of light followed by a right-hand circularly polarized pulse of light followed by a left-hand circularly polarized pulse of light and so on, in repetitive sequence. The CPLP then passes through a focusing lens 4 which focuses the CPLP onto scanner 7 which, by reflection, is adapted to direct the CPLP across the surface of liquid crystalline film 8 in the direction from left to right or right to left (as in a line of typing) and in the direction of from top to bottom or bottom to top (as in the spacing of typed lines). The CPLP passes through liquid crystal film 8, in optical transmission. Since, as previously stated above, circular dichroism is by definition, the difference in absorption of left-hand circularly polarized light and right-and circularly polarized light, or vice versa, depending upon the sign of the circular dichroism, it can be seen that the CPLP is affected in the relative amounts of magnitude or strength of the individual right-hand circularly polarized light pulses and left-hand circularly polarized light pulses passing through liquid crystal film 8. The CPLP is thus changed from CPLP comprising right-hand circularly polarized light pulses and left-hand circularly polarized light pulses of equal magnitude which exists prior to impingement of liquid crystal film 8 into a CPLP which is modulated in accordance to the presence or absence of circular dichroism at a particular point in liquid crystal film 8, in accordance with the sign of circular dichroism present at a particular point in film 8, in accordance with the magnitude of circular dichroism present at a particular point in film 8, and so forth, as previously described above. The modulated CPLP then passes through a collecting lens 9 which focuses the modulated CPLP from any point in liquid crystal film 8 into intensity detector 10. Intensity detector 10 detects alternate strengths or magnitudes of right-hand circularly polarized light and left-hand circularly polarized light and, in that sense, reads the modulated CPLP. A signal is generated by the intensity detector 10 which is modulated in real time in accordance with the intensity detected. The modulated signal from detector 10 enters signal transmitter and processor 11 which generates synchronized pulses or signals for transmission to the receiving station where it is responded to by the readout scheme depicted in FIG. 4.

Figure 4:
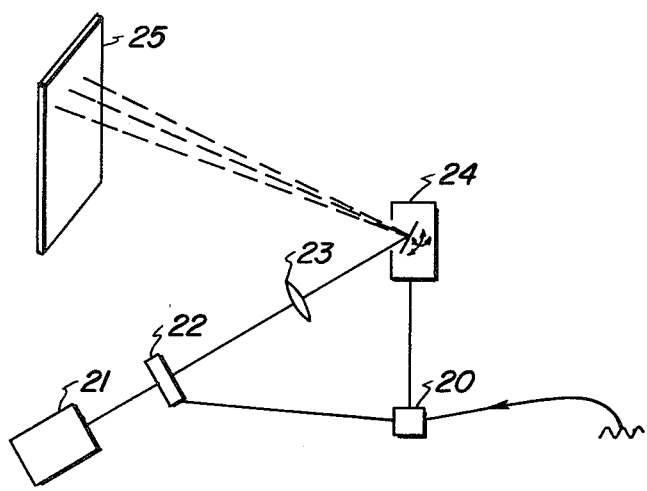
FIG. 4 is a schematic illustration of a scheme whereby the synchronized signals produced by the schemes depicted in FIGS. 3 and 5 are converted to optical information which addresses optical information recording devices.

The synchronized pulse or signal produced by signal transmitter and processor 11 in FIG. 3 is received at the receiving station by synchronizer 20, schematically illustrated in FIG. 4. Synchronizer 20 is operatively connected to modulator 22, which modulates the intensity of light from light source 21, and is also operatively connected to scanner 24 which, by reflection, directs intensity modulated light from light source 21 upon the surface of optical information receiving member 25. In real time, synchronizer 20 positions scanner 24 so that the point of receiving member 25 that is addressed by the reflected intensity modulated light corresponds in an information sense (for example, the same relative position in an image) to the point in liquid film 8 of FIG. 3 which produced the modulation in the CPLP detected by intensity detector 10 and transmitted by element 11 of FIG. 3 in the form of synchronized pulses or signals. In this manner, the loop is closed between a point in liquid crystal film 8 of FIG. 3 and a corresponding point in an information sense in receiving member 25 of FIG. 4. Thus, it can be seen that the image transfer system herein described is a system which reads information bit by bit. The information read, of course, is information concerning circular dichroism in the extrinsically optically active insoluble material in contact with the optically negative liquid crystalline material of liquid crystal film 8 in FIG. 3.

In operation, the readout scheme illustratively depicted in FIG. 4 can be practiced with any conventional readout scheme and by using apparatus well known to those skilled in the art. Preferably, light source 21 in FIG. 4 is identical with light source 1 of FIG. 3 in order to minimize any distortions, difficulties, or inconveniences caused by the use of two different sources in a synchronized mode. Lasers are preferred as a light source for the reasons stated above. Modulator 22 can be selected from a broad range of modulators but is to be selected as to be compatible with receiving member 25. That is, if receiving member 25 is micro-film or a photo-conductive drum, modulator 22 is conveniently an intensity modulator which modulates the intensity of the output of light source 21 into pulses of varying intensities corresponding to the relative strengths of right-hand circularly polarized light and left-hand circularly polarized light transmitted through liquid crystal film 8 of FIG. 3. As clearly indicated, this is on a synchronized basis so that the modulated light striking any particular point on receiving member 25 of FIG. 4 presents information to that particular point on receiving member 25 which corresponds to the circular dichroism information on the corresponding particular point, in the informational sense, of liquid crystal film 8 of FIG. 3. In this connection, input element 12 of transmitter and processor 11 of FIG. 3 is operatively connected to output element 12' of scanner 7 of FIG. 3 so that the synchronized pulses or signals generated by transmitter 11 contains information on the position of scanner 7 as well as information on the relative strengths of right-hand circularly polarized light and left-hand circularly polarized light.

Referring now to FIG. 5, there is seen schematically illustrated an embodiment of a readin scheme which is the reflection equivalent of the transmission scheme depicted in FIG. 3. That is, like numerals refer to like elements. Readin by optical reflection is accomplished in FIG. 5 by the insertion of a beam splitter such as a half-silvered mirror 31 between scanners 7 and liquid crystal film 8. Beam splitter 31 acts essentially as a one-way mirror, allowing light reflected from scanner 7 through lens 30 to pass through beam splitter 31 and impinge upon liquid crystal film 8 but which prevents light reflected from liquid crystal film 8 from passing back through beam splitter 31, but rather, causes light reflected from film 8 to be directed into collecting lens 9.

Any suitable apparatus may be selected for the particular elements depicted in FIGS. 3, 4, and 5 so long as they are selected to be system compatible. Typical suitable apparatus for the various elements include, for example, a raster or digital scan scanner for scanner 7 and scanner 24; a laser or an incandescent light source used in conjunction with appropriate filters and modulators for light source 1 and light source 21; Polaroid Sheet for linear polarized 2, available from the Polaroid Corporation; quarter waveplates available from the Polaroid Corporation oscillated between two positions approximately 90° apart, each position providing an orientation of the retardation axis of the quarter waveplate to the transmission direction of the linear polarizer 2 of about 45° can conveniently constitute electro-optic modulator 3; liquid crystal film 8 can comprise any of the aforementioned optically negative liquid crystalline materials in contact with any of the aforementioned extrinsically optically active insoluble materials, said insoluble materials being either dispersed in particles in liquid crystal film 8 or being in layer configuration in contact with the optically negative liquid crystalline material of film 8; a square law detector, such as, for example, the EG and G light mike available from the EG and G Company; signal transmitter and processor 11 can be selected from a host of electronic amplifiers currently commercially available; similarly, intensity modulator 22, synchronizer 20, optical information recording element 25, beam splitter 31 and the various lenses can be selected from any of the many commercially available respective elements provided that they are system compatible.

As can be seen from the above description, circular dichroism is induced in extrinsically optically active materials which are in contact with optically negative liquid crystalline materials and which are insoluble while in contact with optically negative liquid crystalline materials. This inducement of circular dichroism results in a circular dichroism in the absorption band of the extrinsically optically active insoluble material and as discussed above, the induced circular dichroism can be altered in sign, can be selectively created, and can be tailored in intensity by the application of foreign stimuli and by the selection of the optically negative liquid crystalline materials having predetermined intrinsic helical sense. Thus, differences in circular dichroism can be selectively created at predetermined locations on liquid crystal film 8; such as, for example, an imagewise pattern of circular dichroism against a background of no circular dichroism, or, an imagewise configuration of circular dichroism which is positive in sign against a background of circular dichroism which is negative in sign, or, an imagewise configuration of circular dichroism which is of relatively great magnitude or strong intensity against a background of circular dichroism which is of relatively low intensity or small magnitude; or, combinations thereof.

It will be appreciated, of course, that the light produced by light source 1 and light source 21 should at least contain light at a wavelength within the absorption band of the extrinsically optically active insoluble materials in which circular dichroism is induced by contact with the optically negative liquid crystalline material selected.

While the invention has been described in detail with respect to certain embodiments thereof it is not intended to be limited thereto, but rather it will be appreciated by those skilled in the art that modifications and variations are possible which are within the spirit of the invention and the scope of the claims.

For example, scanners 7 and 24 may be selected such that they operate in timed sequence with respect to corresponding informational points of liquid crystal film 8 and receiver or recorder member 25. In that case, output 12' and input 12 in FIGS. 3 and 5 may be dispensed with, and, in that case, synchronizer 20 may additionally be selected so that it need not be operatively connected to scanner 24 in the readout scheme.

Generally speaking, this invention involves a bit by bit read-in sequence of liquid crystal induced dichroism such as, for example, an imagewise pattern of liquid crystal induced circular dichroism intensity, induced in extrinsically optically active insoluble material in contact with an optically negative liquid crystalline material. Any suitable apparatus may be used such as, for example, the use of a light source whose output is first linearly polarized and subsequently converted into alternating left and right hand circularly polarized light pulses by means of a properly oriented electro-optic modulator. Other suitable apparatus such as, a lens, scanner, and collecting lens can be employed to transfer the liquid crystal induced circular dichroism information bit by bit into an intensity detector-signal transmitter and processor component which detects the alternate strengths of left and right hand circularly polarized light. The apparatus is selected and operatively connected, typically, so that pulses of both right-hand circularly polarized light and left-hand circularly polarized light in the CPLP impinge upon the same information point of the liquid crystal film; so that a comparison can be made by the intensity detector as to the relative strengths of right and left-hand circularly polarized light either transmitted (as in FIG. 3) or reflected (as in FIG. 5) by the material in which circular dichroism is induced; so that if, for example, there is no difference in absorption of left and right-handed circularly polarized light, the synchronizer in the information transfer read-in system and which controls the intensity modulator and scanner of the read-in system, will not be activated; and, so that when circular dichroism is detected and electronic pulse is sent to the synchronizer so that the sychronizer activates the intensity modulator and the scanner allowing the output of the light source, such as a laser beam, to write onto microfilm or a photoconductive drum or other optical information recording device to thereby produce a permanent record of the circular dichroism image.

Further, the optical properties of the normally extrinsically optically inactive insoluble material can be altered to provide the capability of reading image or background areas to provide a corresponding positive or negative readout. For example, materials which undergo chromic changes such as photochromic, electrochromic, thermo-chromic, crystallization, isomerization, dimerization, oligomerization, and piezochromic changes can be employed to selectively shift the absorption bands of the insoluble materials in contact with the optically negative liquid crystalline material.

This selective shift can be caused to occur either in imagewise or background areas of pre-existing images or can be utilized to create the image and background.

The result of this selective shift is that the induced circular dichroism occurs at different wavelengths.

For example, a thermochromic insoluble material such as lead iodide changes color from red to yellow upon application of heat. If heat is applied in imagewise configuration to either a dispersion or layer of lead iodide in contact with an optically negative liquid crystalline material, then a yellow image on a red background results. If the dispersion or layer is examined by light of a wavelength within the absorption bands of the imagewise configured yellow lead iodide and outside the absorption bands of the background configured red lead iodide, the circular dichroism in image areas can be monitored by the examining light but the examining light cannot monitor the circular dichroism induced in the background configured red lead iodide. The readout is a positive image. Vice versa, if the same dispersion or layer is examined by light of a wavelength within the absorption bands of the red lead iodide (background) and outside the absorption bands of the yellow-lead iodide (image) a negative readout is obtained because the circular dichroism of only the red lead iodide can be monitored by the examining light.

Any of the aforementioned chromic changes can be used to provide similar selective shifting of the absorption bands of the insoluble material. For example, cis to trans isomerization of azo compounds can be utilized to provide such a selective shift.

It will be appreciated, of course, that the selective shift described above can be used in conjunction with previously described changes in the optically negative liquid crystalline materials to provide a variety of combinations for selectively changing the circular dichroism behavior of the dispersion or layer of insoluble material.

Finally, it will be appreciated that insoluble material having different absorption bands can be utilized to form a fixed image and background, each of which image and background has circular dichroism induced at wavelengths different from the other.

What is claimed is:

1. A method for transferring information, comprising:
   a. providing a layer of optically negative liquid crystalline material in contact with an insoluble material; said insoluble material becoming extrinsically optically active, and having an absorption band within which circular dichroism is induced, by said contact with said optically negative liquid crystalline material;
   b. directing at least one right-handed circularly polarized light pulse and at least one left-handed circularly polarized light pulse upon a point of interest of said layer of optically negative liquid crystalline material in contact with said insoluble material, said light pulses being of equal intensity and having a wavelength within the absorption band of said insoluble material; and
   c. converting into a signal the relative magnitudes of said at least one right and left-handed circularly polarized light pulses emerging through said layer of optically negative liquid crystalline material in contact with said insoluble material.

2. The method according to claim 1 wherein said insoluble material is dispersed in said optically negative liquid crystalline material.

3. The method of claim 2 wherein said insoluble material constitutes from about 10% to about 90% by weight of the dispersion.

4. The method of claim 1 wherein said insoluble material is in layer configuration.

5. The method of claim 1 wherein said insoluble material comprises material capable of undergoing chromic changes further including between step (a) and step (b) the step of altering the color of a portion of said insoluble material thereby shifting the absorption bands of said portion of insoluble material.

6. An information transfer device, comprising:
   a. a layer of optically negative liquid crystalline material in contact with an insoluble material; said insoluble material being extrinsically optically active, and having an absorption band within which circular dichroism is induced, when in contact with said optically negative liquid crystalline material;
   b. means for sequentially producing right-handed circularly polarized light pulses and left-handed circularly polarized light pulses of equal intensity and having a wavelength within the absorption band of said insoluble material;
   c. means for directing at least one of said right-handed circularly polarized light pulses and at least one of said left-handed circularly polarized light pulses upon a point of interest of said layer of optically negative liquid crystalline material in contact with said insoluble material; and
   d. means for detecting the relative magnitudes of said at least one right-handed and left-handed circularly polarized light pulses emerging through said layer of optically negative liquid crystalline material in contact with said insoluble material and for converting the relative magnitudes into a signal.

7. The device of claim 6 wherein said insoluble material is dispersed in said optically negative liquid crystalline material.

8. The device of claim 7 wherein said insoluble material constitutes from about 10% to about 90% by weight.

9. The device of claim 6 wherein said insoluble material is in layer configuration.

10. The device of claim 6 wherein said insoluble material comprises material capable of undergoing chromic changes.

* * * * *